G. MADISON.
BORING BAR.
APPLICATION FILED APR. 1, 1914.
1,118,141.
Patented Nov. 24, 1914.
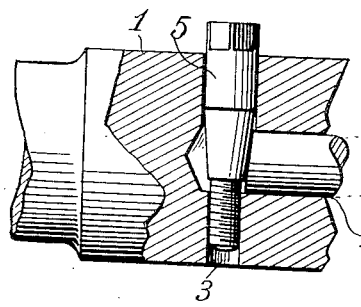
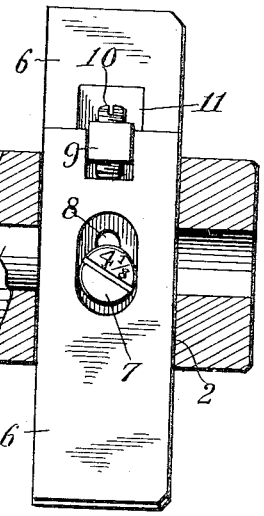
Fig. 1.
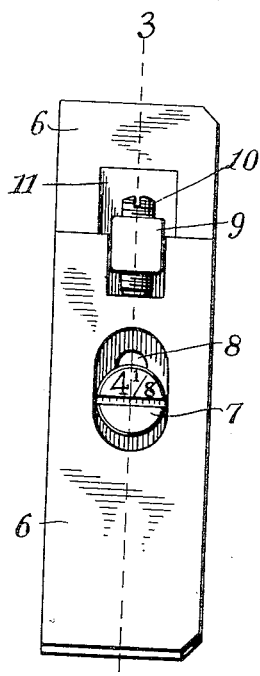
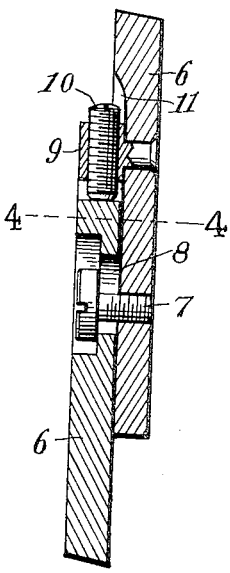
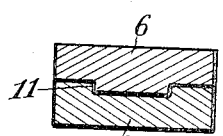
Fig. 2.  Fig. 3.  Fig. 4.
WITNESSES
Harold O. VanAntwerp
Mae Parker
Inventor
George Madison
By Luther V. Moulton
Attorney.

UNITED STATES PATENT OFFICE.

GEORGE MADISON, OF MUSKEGON, MICHIGAN.

BORING-BAR.

1,118,141.　　　Specification of Letters Patent.　　Patented Nov. 24, 1914.

Application filed April 1, 1914. Serial No. 828,796.

*To all whom it may concern:*

Be it known that I, GEORGE MADISON, a citizen of the United States of America, residing at Muskegon, in the county of Muskegon and State of Michigan, have invented certain new and useful Improvements in Boring-Bars; and I do hereby declare the following to be a full, clear, and exact description of the invention, such as will enable others skilled in the art to which it appertains to make and use the same.

My invention relates to improvements in boring bars and its object is to provide a cutter that can be adjusted as it is worn away; to provide improved means for holding the cutter and to provide the device with various new and useful features as hereinafter more fully described and particularly pointed out in the claims.

My invention consists essentially of a bar having transverse openings to respectively receive the cutter and a conical screw, and also having an axial opening, a longitudinally movable rod in the axial opening of the bar to engage the cutter and engaged by the screw and a cutter formed of two substantially equal members slidably overlapping at their inner ends and provided with an adjusting screw and a binding screw, the latter being marked to indicate the size of the cutter and changed to a screw differently marked when it has been worn so as to be necessary to adjust it to a smaller size, as will more fully appear by reference to the accompanying drawing in which:

Figure 1 is an elevation of device embodying my invention with portions of the bar broken away. Fig. 2 a detail of the cutter. Fig. 3 a longitudinal section of the same on the line 3—3 of Fig. 2, and Fig. 4 a transverse section on the line 4—4 of Fig. 3.

Like numbers refer to like parts in all of the figures.

In the form shown 1 reperesents a boring bar having a transverse rectangular opening 2 for the cutter and a transverse circular opening 3 to receive a tapered screw.

In the axis of the bar is a longitudinally movable rod 4 engaging the cutter at one end to hold the same in place, and forced against the same by a tapered screw 5, in the opening 3. The cutter consists of two substantially equal cutting tools 6, provided with cutting outer ends and overlapping each other at their inner ends which ends extend within the opening 2 in the bar and are provided with a tongue and groove forming a slidable connection to hold the cutters in alinement, and permit them to be adjusted to properly space apart the cutting ends to adjust the same for wear.

9 is a lug fixed in one cutter and projecting opposite the inner end of the other cutter.

10 is a screw inserted in the lug and engaging the end of this other cutter to adjust the same.

The flat head of the screw 7 is counter bored into the cutter and on the head are figures indicating the size of hole that the cutter is adjusted for, and when the cutter is worn away so that it can be no longer adjusted for the indicated size the screw is removed and another substituted therefor marked to indicate a smaller size and the cutter re-adjusted to this smaller size until further worn down.

I can thus use the cutter for a long time and have it properly marked for size at all times until it is entirely worn out.

What I claim is:

1. A boring bar, including two rectangular cutter members having cutting outer ends and slidably overlapping each other at their inner ends, a binding screw inserted transversely of said cutters and adjustable in a slot in one of the cutters and an adjusting screw mounted on one cutter member at the side thereof and engaging the end of the other cutter member to adjust the same.

2. In a boring bar comprising a cutter consisting of two rectangular cutter members having cutting outer ends and overlapping each other at their inner ends, one cutter member being provided with a slot and countersink to receive a screw, a screw in said slot and threaded in the other cutter member, a lug on one cutter member projecting opposite the end of the other cutter member and an adjusting screw in the lug bearing against the end of a cutter member.

3. A boring bar, including two substantially rectangular cutter members slidably connected by a longitudinal tongue and groove, a binding screw connecting said cutter members and adjustable in a slot in one of the same, a lug mounted on one cutter member and extending from a side thereof, a screw threaded through the lug bearing at its end against the end of the other cutter member to adjust the same.

In testimony whereof I affix my signature in the presence of two witnesses.

GEORGE MADISON.

Witnesses:
 HAROLD O. VAN ANTWERP,
 LUTHER V. MOULTON.

Copies of this patent may be obtained for five cents each, by addressing the "Commissioner of Patents, Washington, D. C."